(12) United States Patent
Dielacher et al.

(10) Patent No.: US 10,591,588 B2
(45) Date of Patent: Mar. 17, 2020

(54) ELECTRICAL MIXER AS REFERENCE PATH FOR TIME-OF-FLIGHT MEASUREMENT

(71) Applicant: Infineon Technologies AG, Neubiberg (DE)

(72) Inventors: Markus Dielacher, Graz (AT); Martin Flatscher, Graz (AT); Stefan Gansinger, Graz (AT); Alexander Venus, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/957,323

(22) Filed: Apr. 19, 2018

(65) Prior Publication Data

US 2019/0324128 A1 Oct. 24, 2019

(51) Int. Cl.
*G01S 17/32* (2006.01)
*G01S 7/497* (2006.01)
(Continued)

(52) U.S. Cl.
CPC ............ *G01S 7/497* (2013.01); *G01S 7/4915* (2013.01); *G01S 17/32* (2013.01); *G01S 17/89* (2013.01)

(58) Field of Classification Search
CPC ....... G01N 21/4795; G01N 2201/0612; G01N 2201/12; G01N 33/49; G01N 21/3577; G01N 21/359; G01N 21/49; G01N 2201/062; G01N 2201/067; G01N 2201/129; G01N 33/4833; G01N 15/1459; G01N 21/274; G01N 21/3581; G01N 15/0205; G01N 15/0211; G01N 15/042; G01N 15/1434; G01N 15/1463; G01N 2015/0053; G01N 2015/0222; G01N 2015/025; G01N 2015/1006; G01N 2015/1447; G01N 2015/1486; G01N 2015/1493; G01N 2015/1497;
(Continued)

(56) References Cited

U.S. PATENT DOCUMENTS

2003/0117622 A1\* 6/2003 Sevick-Muraca ............................ G01N 15/0211
356/338
2008/0117406 A1 5/2008 Luo et al.
(Continued)

OTHER PUBLICATIONS

Extended European Search Report for Application No. EP19169741.6, dated Sep. 11, 2019, 8 pages.

*Primary Examiner* — Michael P Stafira
(74) *Attorney, Agent, or Firm* — Harrity & Harrity, LLP (57) ABSTRACT

An imaging system may include a modulation component to provide a modulation signal. The imaging system may include an illumination component to receive the modulation signal and emit a modulated optical signal based on the modulation signal, and provide an electrical illumination signal. The electrical illumination signal may be an electrical representation of the modulated optical signal emitted by the illumination component. The imaging system may include an electrical mixer to receive the electrical illumination signal and the modulation signal, multiply the electrical illumination signal and the modulation signal in order to form a mixed signal, filter the mixed signal in order to form a filtered mixed signal, and output, based on the filtered mixed signal, a calibration signal associated with calibrating the imaging system.

11 Claims, 5 Drawing Sheets

(51) Int. Cl.
*G01S 7/4915* (2020.01)
*G01S 17/89* (2020.01)

(58) Field of Classification Search
CPC ... G01N 2021/3181; G01N 2021/4707; G01N 2021/653; G01N 2021/655; G01N 2021/7786; G01N 21/31; G01N 21/4738; G01N 21/474; G01N 21/53; G01N 21/65; G01N 21/75; G01N 21/78; G01N 21/8483; G01N 2201/0621; G01N 2201/0627; G01N 2201/0691; G01N 2201/0697; G01N 2291/02475; G01N 24/10; G01N 24/12; G01N 29/0654; G01N 29/262; G01N 29/46; G01N 33/48707; G01N 33/4875; G01J 3/0218; G01J 3/433; G01J 3/0208; G01J 3/108; G01J 3/4338; G01J 3/453; G01J 2003/4332; G01J 3/02; G01J 3/021; G01J 3/0264; G01J 3/10; G01J 3/42; G01J 3/44; G01J 3/4412; G01J 9/0215; G01J 1/44; G01J 1/46; G01J 2001/4406; G01J 2003/104; G01J 2003/106; G01J 2003/2826; G01J 2003/4334; G01J 3/0297; G01J 3/28; G01J 3/2823; G01J 3/4406; G01B 2290/45; G01B 2290/70; G01B 9/02002; G01B 9/02004; G01B 9/02043; G01B 9/02075; G01B 9/02081; G01B 9/02083; G01B 9/02084; G01B 9/0209; G01B 9/02091; G01B 11/026; G01B 11/14; G01B 11/26; G01B 15/00
See application file for complete search history.

(56) References Cited

U.S. PATENT DOCUMENTS

| | | | |
|---|---|---|---|
| 2009/0218515 A1* | 9/2009 | Tjin | G01N 21/05 250/459.1 |
| 2015/0138371 A1 | 5/2015 | Dielacher et al. | |
| 2015/0198528 A1* | 7/2015 | Manneh | G01N 21/6408 506/4 |

\* cited by examiner

ELECTRICAL MIXER AS REFERENCE PATH FOR TIME-OF-FLIGHT MEASUREMENT

BACKGROUND

A time-of-flight (ToF) based imaging system may determine a distance to an object based on an amount of time needed for a modulated optical signal, emitted by an illumination source of the imaging system, to be reflected back to an array of photosensitive pixels of the imaging system. The amount of time can be identified based on a difference between a phase of the modulated optical signal when emitted by the illumination source and a phase of the modulated optical signal when received by the array of photosensitive pixels.

SUMMARY

According to some possible implementations, an imaging system may include a modulation component to provide a modulation signal; an illumination component to receive the modulation signal and emit a modulated optical signal based on the modulation signal, and provide an electrical illumination signal, wherein the electrical illumination signal is an electrical representation of the modulated optical signal emitted by the illumination component; an electrical mixer to receive the electrical illumination signal and the modulation signal, multiply the electrical illumination signal and the modulation signal in order to form a mixed signal, filter the mixed signal in order to form a filtered mixed signal, and output, based on the filtered mixed signal, a calibration signal associated with calibrating the imaging system.

According to some possible implementations, a system may include an electrical mixer to receive, from an illumination component of the system, an electrical illumination signal that is an electrical representation of a modulated optical signal emitted by the illumination component; receive, from a modulation component of the system, a modulation signal associated with modulating an optical signal to form the modulated optical signal; multiply the electrical illumination signal and the modulation signal in order to form a mixed signal; filter the mixed signal in order to form a filtered mixed signal; and provide, to a calibration component of the system and based on the filtered mixed signal, a calibration signal associated with calibrating the system.

According to some possible implementations, a method may include receiving, by an electrical mixer included in an imaging system, an electrical illumination signal that is an electrical representation of a modulated optical signal emitted by an illumination component of the imaging system; receiving, by the electrical mixer, a modulation signal associated with forming the modulated optical signal; mixing, by the electrical mixer, the electrical illumination signal and the modulation signal in order to form a mixed signal; filtering, by the electrical mixer, the mixed signal in order to form a filtered mixed signal; and providing, by the electrical mixer, a calibration signal based on the filtered mixed signal, wherein the calibration signal is associated with calibrating the imaging system.

DETAILED DESCRIPTION

The following detailed description of example implementations refers to the accompanying drawings. The same reference numbers in different drawings may identify the same or similar elements.

A ToF-based imaging system (herein referred to as an imaging system) may determine a distance from the imaging system to an object based on an amount of time that a modulated optical signal (e.g., a series of light pulses) takes to travel to, and back from, the object. The amount of time can be identified based on a difference between a phase of the modulated optical signal when emitted by an illumination component of the imaging system and a phase of the modulated optical signal when received by a sensor component (e.g., including one or more photosensitive pixels) of the imaging system. Here, since the speed of light is known, the distance can be determined based on the identified amount of time. The following embodiments will be described for a continuous wave (CW) ToF imaging system but it is to be understood that embodiments can be utilized in other ToF imaging systems. In a CW ToF imaging system light is continuously modulated during an emitted frame based on a modulation signal. The modulation signal may be a periodic signal having a rectangular (light on and off), a sine waveform or other waveforms. The modulation signal may have a frequency up to the RF range (for example up to 150 MHz) but other frequencies may also be used depending on application and technology. The CW ToF imaging system includes an imager with photosensitive sensor pixels. Each of the sensor pixels receives a portion of the reflected light and the modulation signal to demodulate the reflected light. Demodulation may be based on photonic mixing in which the modulation signal is provided to each pixel to control a transfer of photo-generated charge carriers to opposing charge collection nodes within the pixel. In some embodiments, controlling may be based on providing the modulation signal to multiple gates which control and transfer the photo-generated charge carriers to the charge collection nodes. Based on the phase difference between the modulation signal and the received reflected light, photo-generated charge carriers are mainly transferred to one of the opposing charge collection nodes or to both charge collection nodes. The charges are stored over multiple periods of the modulation signal providing an integration in each pixel. After integration, the collected charges from both opposing charge collection nodes are read out and a phase difference of the reflected light with respect to the modulation signal can be determined therefrom.

While in the ideal scenario, the emitted light is modulated instantaneous with the modulation signal waveform, in practice a delay within the imaging system may introduce an error to such distance measurements. The delay may be a delay associated with the illumination component. For example, the delay may be equal to an amount of time between a time at which the illumination component is triggered to emit a modulated optical signal, and a time at which the illumination component actually emits the modulated optical signal. Such a delay can be caused by, for example, an electrical circuit associated with generating the modulated optical signal, an illumination source that emits the modulated optical signal, and/or the like. Unfortunately, such a delay can be a temperature dependent delay, a supply voltage dependent delay, a process dependent delay, and/or the like, meaning that the delay drifts (i.e., are non-constant) and, therefore, cannot be easily calibrated. As such, calibration can be complicated, and may require calibration on both a chip-level and a component level (e.g., at different temperatures). Furthermore, depending on a design life-time of a component of the imaging system (e.g., the electrical circuit associated with generating the modulated optical signal) drift of the delay might have a significant influence, which can result in an error that cannot be calibrated.

Known techniques aimed at avoiding the need for a complicated calibration procedure are based on using a reference path with a known distance, where the reference path experiences the same drift in the delay as paths associated with pixels of the pixel array. Thus, using the known distance, the drift can be measured and the result applied to calibrate the pixels of the imaging system.

A first known technique uses an off-chip reference pixel (or an off-chip reference diode). According to this technique, a discrete reference pixel is arranged (off-chip) at a known distance from an illumination source, and a portion of the modulated optical signal (e.g., a certain amount of the light emitted by the illumination source) is directly coupled to the reference pixel. However, an electrical setup needed to implement this technique is complicated. Moreover, the discrete reference pixel requires use of control signals generated by the imaging system, and these control signals are again subject to drift (e.g., temperature dependent drift). Thus, this technique can be used to compensate for drift caused by the illumination source itself, but cannot be used to compensate for drift of any on-chip circuits.

A second known technique uses an on-chip optical reference pixel (on-chip reference diode). This technique is based on coupling a portion of the modulated optical signal directly into the on-chip optical reference pixel using an optical fiber. Here, the optical reference pixel can be embedded into a pixel array so that the optical reference pixel is controlled by the same control signals as other pixels of the pixel array, which may allow for drift compensation. However, this technique requires a complicated and/or expensive optical setup (e.g., since an optical fiber is required, optical crosstalk from the reference path to the other pixels must be avoided, and/or the like).

A third known technique uses an on-chip electrical reference pixel. According to this technique, a selected pixel of the pixel array is modified such that an optical input to the selected pixel is replaced by an electrical input (i.e., the selected pixel is modified to create the electrical reference pixel). The assumption behind this technique is that an electrical representation of the modulated optical signal can be derived from the illumination component (e.g., based on a current through the light source). This electrical representation of the modulated optical signal can then be input to the selected pixel (rather than an optical input). As with the technique that uses the on-chip optical reference pixel, the electrical reference pixel is included in the pixel array and, theoretically, the drift can be compensated. However, in practice, a modulation behavior of such an on-chip electrical reference pixel differs significantly from modulation behavior of optical pixels of the pixel array. Furthermore, the electrical reference pixel introduces cross-talk to the optical pixels. Thus, complexity and/or cost of a suitable electrical reference pixel may be prohibitively high.

Some implementations described here provide techniques and apparatuses for compensating for a drift in a delay of an illumination component of an imaging system based on using an on-chip electrical mixer. The electrical mixer may be a RF mixer or utilize a same structure or circuit as RF mixers which are typically used to mix RF or radar signals. Typically the electrical mixer includes an integrated circuit with a non-linear electrical element (such as a diode) as mixing stage receiving the two electrical signals for mixing and providing a resulting mixed electrical signal. The electrical mixer may further include electrical circuitry (such as multiple transistors). In some implementations, the electrical mixer may be an on-chip electrical circuit capable of multiplying an electrical illumination signal, associated with the illumination component of the imaging system, and a modulation signal associated with a modulation component of the imaging system. Electrical mixers are constructed to provide as output signal of a mixing stage of the mixer an electrical signal having signal components with a frequency corresponding to a sum of the two frequencies of the input signals of the mixer and/or a difference of the two frequencies of the input signals. By multiplying two signals having the same frequency but a phase difference ($\Phi$), the resulting mixing signal contains a time independent signal component depending only on the phase difference (e.g., sin $\Phi$) and a time-varying component. The electrical mixer may filter a result of the multiplication in order to eliminate the time-varying component and may provide the output signal for use in calibrating for the delay of the illumination component. Here, since the electrical mixer is on-chip (e.g., on a same chip as a pixel array), suitable drift compensation is provided. Moreover, since the electrical mixer is merely an electrical circuit (rather than a pixel), a complexity and/or cost of the device is reduced (e.g., as compared to that of a reference pixel, as described above in association with the known techniques).

Use of an electrical mixer also provides a number of other advantages over the use of a reference pixel (e.g., an on-chip electrical reference pixel). For example, in operation, a reference pixel receives a pair of signals (e.g., a modulation signal and a modulated optical signal, or a modulation signal and an electrical representation of the modulated optical signal), both of which have the same frequency, but different phases (where the phase difference depends on the distance, as described above). Here, in order to determine the phase difference (i.e., a phase shift), the reference pixel multiplies the signals and performs an integration over a particular amount of time (e.g., an amount of time equal to an exposure time of the pixels of the pixel array). Thus, an output of the reference pixel depends on both the phase difference and the integration time. In other words, the reference pixel is designed to behave exactly like other pixels of the pixel array.

In contrast, in order to determine a phase difference, an electrical mixer multiplies a pair of received signals and filters a result of the multiplication (e.g., using a low-pass filter), but does not perform any integration. As such, an output of the electrical mixer depends on only the distance (i.e., the output of the electrical mixer is not dependent on any integration time since no integration is performed). In other words, the electrical mixer is designed to behave differently than pixels in the pixel array (i.e., the electrical mixer does not operate on the principle used in the pixels).

This difference in generation of outputs means that an output of a reference pixel is available only for post-processing of a measured distance (e.g., since the output of the reference pixel would be non-constant over time, which necessitates the need for integration), while an output of an electrical mixer is available for use at an earlier time (e.g., since no integration is needed). In other words, since the integration time for the reference pixel is the same as that of other pixels of the pixel array, all pixels of the pixel array are read out at a same time (e.g., after the integration). This means that an output of the reference pixel (e.g., a calibration signal) is available at the same time as distance measurements from the other pixels of the pixel array (e.g., after exposure of the pixels). Conversely, the electrical mixer can be used for in-line regulation of the delay (e.g., since the output of the electrical mixer depends on only the distance and not integration time). Thus, an output of the electrical mixer is available earlier (e.g., during the exposure of the pixels) than an output of a reference pixel. As such, there is no need to wait until an error is introduced and then perform compensation. Rather, the output of the electrical mixer can be used immediately. For example, a regulation loop could be used in order to compensate for the delay immediately, thereby negating a need for post-processing.

Another advantage of using the electrical mixer (rather than a reference pixel) is the usage in design-for-test (DFT). For example, an imaging system may need to provide a particular amount of phases of a signal to an illumination component and a pixel array for modulation, and these phase settings have to be tested (e.g., in production). As these are typically high frequency signals that may have to be routed and measured off-chip, these measurements are challenging and/or error prone. However, using an electrical mixer (and an on-chip analog-to-digital convertor (ADC)), any phase related signals can be tested fully on-chip, with a high degree of accuracy.

Figure 1:
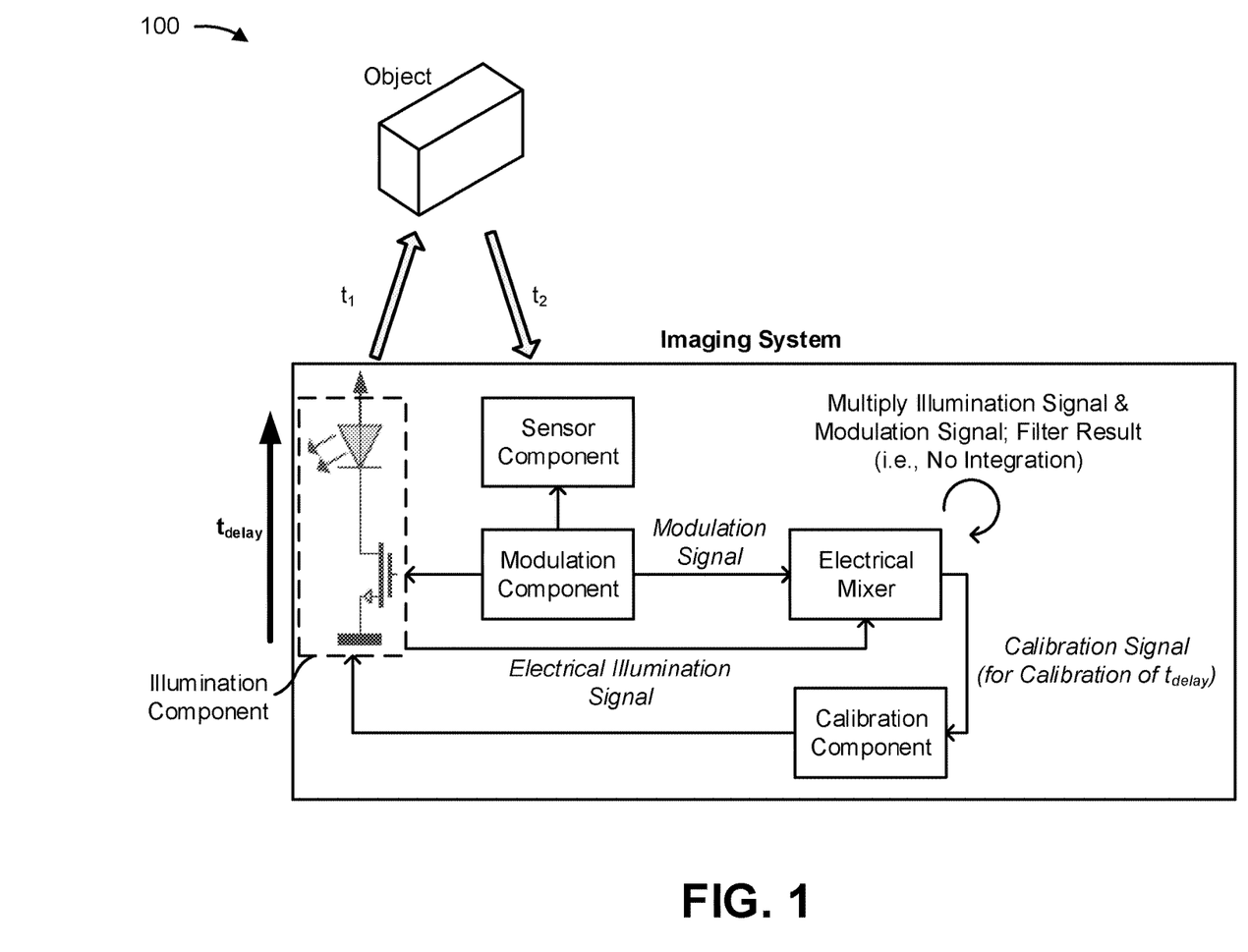
FIG. 1 is a diagram of an overview of an example implementation described herein.

FIG. 1 is a diagram of an overview of an example implementation 100 described herein. As shown in FIG. 1, an imaging system may include an illumination component, a modulation component, a sensor component, an electrical mixer, and a calibration component. The illumination component may emit a modulated optical signal (e.g., a series of light pulses). The frequency of the modulated optical signal depends on a modulation signal provided to the illumination component by the modulation component. In other words, the frequency at which light pulses are emitted may match a frequency of the modulation signal. As shown, the modulation component also provides the modulation signal to the sensor component (e.g., for use in determining distances) and the electrical mixer (e.g., for use in generating a calibration signal), as described below.

As shown, the modulated optical signal may take time $t_1$ to reach an object, may be reflected by the object, and may take time $t_2$ to reach the sensor component (e.g., such that the modulated optical signal is received at one or more pixels of an array of photosensitive pixels included in the sensor component). The imaging system (e.g., the sensor component) can determine a distance to the object based on a phase shift between a phase of the received modulated optical signal (i.e., the modulated optical signal received at the pixel) and a phase of the modulation signal (e.g., by determining a time of flight based on the phase shift, and by determining a distance based on the time of flight). However, as shown in FIG. 1 and as described above, the illumination component may introduce a delay ($t_{delay}$) that results in an error in the distance determined by the imaging system, and this delay may have a drift that depends on a number of factors, such as temperature at or near the illumination component, a supply voltage used to control the illumination component, and/or the like.

Here, the electrical mixer may be used in association with calibrating this delay, while also compensating for any drift in the delay. For example, as shown, the electrical mixer may receive the modulation signal and an electrical representation of the modulated optical signal (herein referred to as an electrical illumination signal). An electrical representation of the modulated optical signal is a time varying signal which has a same frequency as the modulated optical signal and has a fixed phase relationship with the modulated optical signal. As shown, the electrical mixer may multiply the electrical illumination signal and the modulation signal, thereby forming a mixed signal. The electrical mixer may then filter (e.g., using a low-pass filter) the mixed electrical signal, thereby forming a filtered mixed signal. As shown, the electrical mixer may output a calibration signal, associated with calibrating for $t_{delay}$, based on the filtered mixed signal. The calibration component may receive the calibration signal, and may calibrate the illumination component, based on the calibration signal.

In this way, the electrical mixer may be used in association with calibrating delay associated with the illumination component. Further, since the electrical mixer is an on-chip electrical circuit (rather than a pixel), the electrical mixer compensates for drift in the delay of the illumination component, while providing the advantages described above. For example, as noted with respect to FIG. 1, the electrical mixer multiplies the electrical illumination signal and the modulation signal, but does not perform an integration, as pixels of the pixel array are required to do. Thus, the calibration signal may be available at a time that permits in-line regulation of the delay to be achieved.

In some implementations, the electrical mixer may include one or more other components. For example, the electrical mixer may include a level shifter capable of adjusting a level of the electrical illumination signal before multiplication with the modulation signal, as described below. As another example, the electrical mixer may include a reference generator capable of generating a set of reference signals to be compared to the filtered mixed signal, a result of which is the calibration signal, as described below.

As indicated above, FIG. 1 is provided merely as an example. Other examples are possible and may differ from what was described with regard to FIG. 1.

Figure 2:
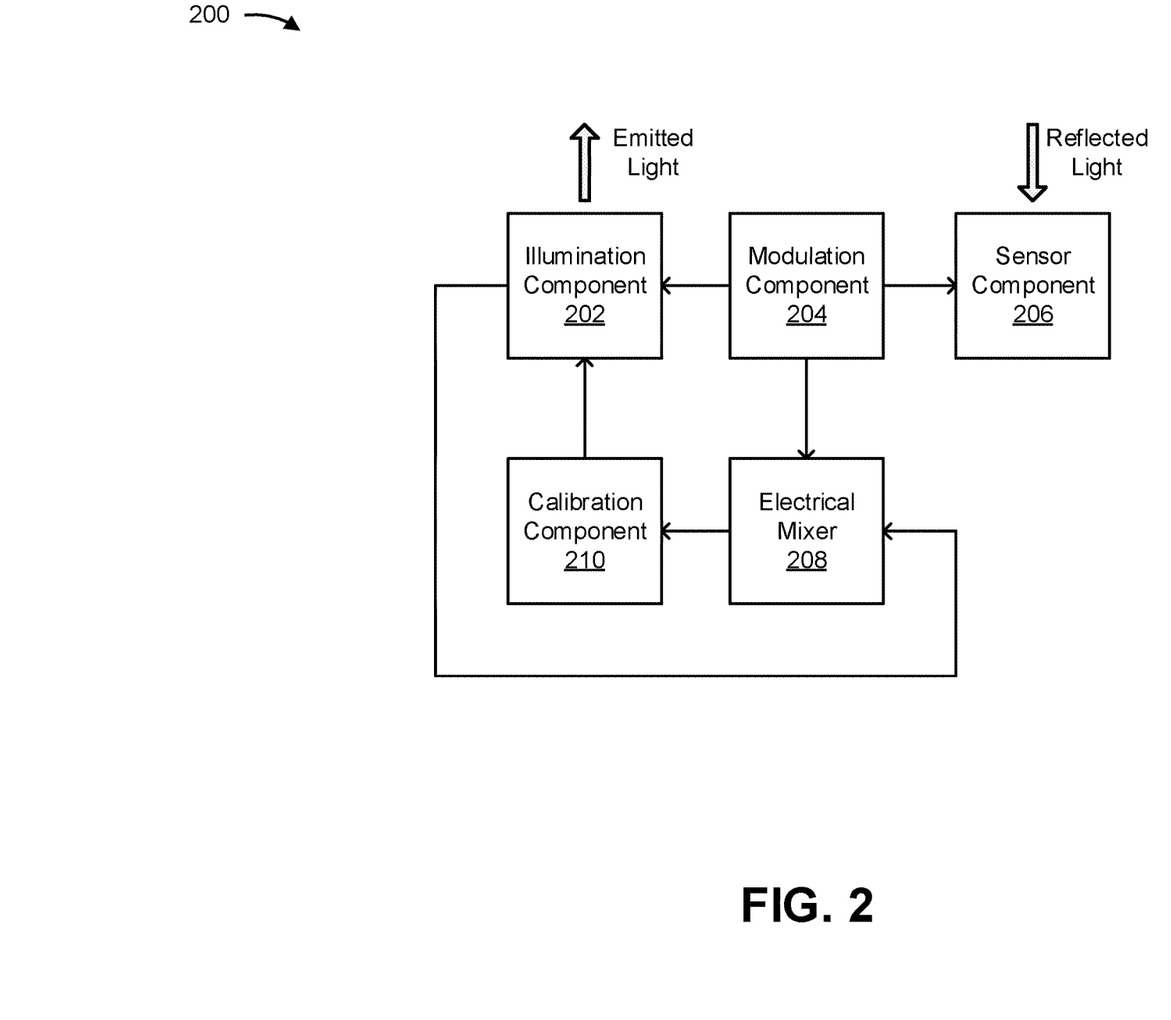
FIG. 2 is a diagram of example components of an imaging system.

FIG. 2 is a diagram of example components of an imaging system 200. As shown, imaging system 200 may include an illumination component 202, a modulation component 204, a sensor component 206, an electrical mixer 208, and a calibration component 210.

Illumination component 202 includes a component to emit a modulated optical signal (e.g., light, such as infrared light). In some implementations, illumination component 202 includes a light emitter, such as a light-emitting diode (LED), a laser emitter, and/or the like. In some implementations, illumination component 202 may be capable of emitting a modulated optical signal in order to illuminate an entire environment (e.g., a predetermined area) in which distances to objects are to be determined. Additionally, or alternatively, illumination component 202 may be capable of emitting a modulated optical signal in order to illuminate the environment in pulses, stages, scans, and/or the like. In various implementations, different forms of optical signals may be emitted from illumination component 202. For example, the modulated optical signal may include one or more modulated light pulses. In some implementations, illumination component 202 may be switched on for a short interval, allowing the modulated optical signal to illuminate an area, including any objects within the area.

In some implementations, illumination component 202 may be capable of providing (e.g., to electrical mixer 208) an electrical illumination signal associated with the modulated optical signal emitted by illumination component 202. In some implementations, the electrical illumination signal is an electrical signal that is an electrical representation of the modulated optical signal emitted by illumination component 202. For example, the electrical illumination signal may correspond to a voltage drop across an illumination source of illumination component 202. Parasitic capacitance of the illumination source may change (e.g., with changes in temperature), which may result in the delay drift of the emitted modulated optical signal. Here, the emitted modulated optical signal may be proportional to the voltage drop across the illumination source, therefore making the voltage drop a sufficient basis for the electrical illumination signal.

In an alternative implementation, the electrical illumination signal may correspond to the current through illumination component 202. In another alternative implementation, the electrical illumination signal may be based on a voltage at a gate of a semiconductor device (e.g., a transistor), included in illumination component 202, that is to switch the illumination source on and off, vary intensity of the illumination, and/or the like. In some implementations, the electrical illumination signal may be based on a signal at another location, including another location with respect to the semiconductor device.

In some implementations, the electrical illumination signal may be provided by a photodiode included in imaging system 200. For example, illumination component 202 may be configured to provide a portion of the modulated optical signal to a photodiode, where the photodiode is arranged at a known (e.g., pre-determined) distance relative to the illumination source (such that a constant phase shift is present in the portion of the modulated signal received at the photodiode). Here, the photodiode receives the portion of the modulated optical signal and converts the portion of the modulated optical signal to an electrical signal, thereby forming the electrical illumination signal. The photodiode may then provide the electrical illumination signal to electrical mixer 208.

Modulation component 204 includes a component associated with modulating an optical signal to form the modulated optical signal emitted by illumination component 202. In some implementations, modulation component 204 causes the optical signal to be modulated based on a modulation signal (e.g., a signal that identifies a frequency at which illumination component 202 is to switch the illumination source on and off). Additionally, or alternatively, modulation component 204 may be capable of modulating one or more photosensitive pixels of sensor component 206 in order to conform to the modulated optical signal. In some implementations, modulation component 204 is capable of correlating the modulation of the optical signal with the modulation of the photosensitive pixels of sensor component 206 during time-of-flight operation (e.g., to calculate a distance of an object from the imaging system 200). In some implementations, modulation component 204 may provide the modulation signal to electrical mixer 208 such the electrical mixer 208 may generate a calibration signal associated with calibrating imaging system 200, as described below.

Sensor component 206 is a component capable of receiving a modulated optical signal after being reflected by an object. In some implementations, sensor component 206 may include an array of photosensitive pixels to receive the modulated optical signal. In one example, individual photosensitive pixels of the array may be individual image sensors. In such an example, a resulting image from sensor component 206 may be a combination of the sensor images of the individual photosensitive pixels. In some implementations, a given photosensitive pixel is capable of converting the reflected modulated optical signal into an electrical signal. In some implementations, signals from the pixels may be processed into an image by one or more processing components of sensor component 206.

In some implementations, sensor component 206 is capable of capturing one or more images of an area, or of object(s) within the area. For example, sensor component 206 may capture a three-dimensional image of the area. In some implementations, sensor component 206 (or the individual pixels of the sensor component 206) may provide a measure of the time for the modulated optical signal to travel from illumination component 202, to the object, and back to each of the pixels of sensor component 206.

Additionally, or alternatively, sensor component 206 may use time-of-flight principles to capture a three-dimensional image of an object within an area, based on a modulated illumination of the area. For example, in some implementations, sensor component 206 can detect whether an object is in the area based on an amount of time taken for the modulated optical signal, emitted from illumination component 202, to be reflected back to the photosensitive pixels of sensor component 206 (e.g., based on a phase shift between the emitted optical signal and the received optical signal). Additionally, or alternatively, sensor component 206 may be capable of determining a distance to the object based on the modulated optical signals received at the array of photosensitive pixels.

Electrical mixer 208 includes a component capable of determining a delay of imaging system 200 and/or capable of outputting a signal (e.g., a calibration signal), associated with the delay, in association with calibrating imaging system 200. As described above, electrical mixer 208 compensates for any drift in the delay. In some implementations, electrical mixer 208 may be arranged to receive the modulation signal from modulation component 204, and to receive the electrical illumination signal from illumination component 202, as described above.

In some implementations, electrical mixer 208 may include an electrical circuit capable of multiplying the electrical illumination signal and the modulation signal in order to form a mixed signal, filtering the mixed signal in order to form a filtered mixed signal, and outputting a calibration signal based on the filtered mixed signal. In some implementations, electrical mixer 208 is not included in the array of photosensitive pixels. In other words, electrical mixer 208 is not working on the principles of a photosensitive pixel included in sensor component 206, in some implementations. Additional details regarding electrical mixer 208 are described below with regard to FIG. 3.

Calibration component 210 includes a component capable of calibrating imaging system 200 for a delay based on a calibration signal (e.g., provided by electrical mixer 208). For example, in some implementations, calibration component 210 may dynamically calibrate imaging system 200 based on changes to the calibration signal. In some implementations, the dynamic calibration is automatic, occurring approximately in real-time, as environmental factors, and/or the like, create variations to the delay. For example, as the delay of one or more portions of imaging system 200 varies, due to environmental conditions, temperature change, fluctuations in supply voltage, and/or the like (as describe above), calibration component 210 can dynamically calibrate imaging system 200 in order to accommodate the varying delay, using the calibration signal.

In some implementations, calibration component 210 may correct a measurement made by imaging system 200 and/or one or more components of imaging system 200. For example, calibration component 210 may adjust a measurement by an amount proportional to the calibration signal. In some implementations, calibration component 210 may adjust other parameters of imaging system 200 and/or one or more components of imaging system 200 (e.g., illumination component 202) such that a resulting measurement, image, and/or the like, is comparatively more accurate.

The number and arrangement of components shown in FIG. 2 are provided as examples. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed devices and/or components. Additionally, or alternatively, a set of components (e.g., one or more components) shown in FIG. 2 may perform one or more functions described as being performed by another set of components shown in FIG. 2.

Figure 3:
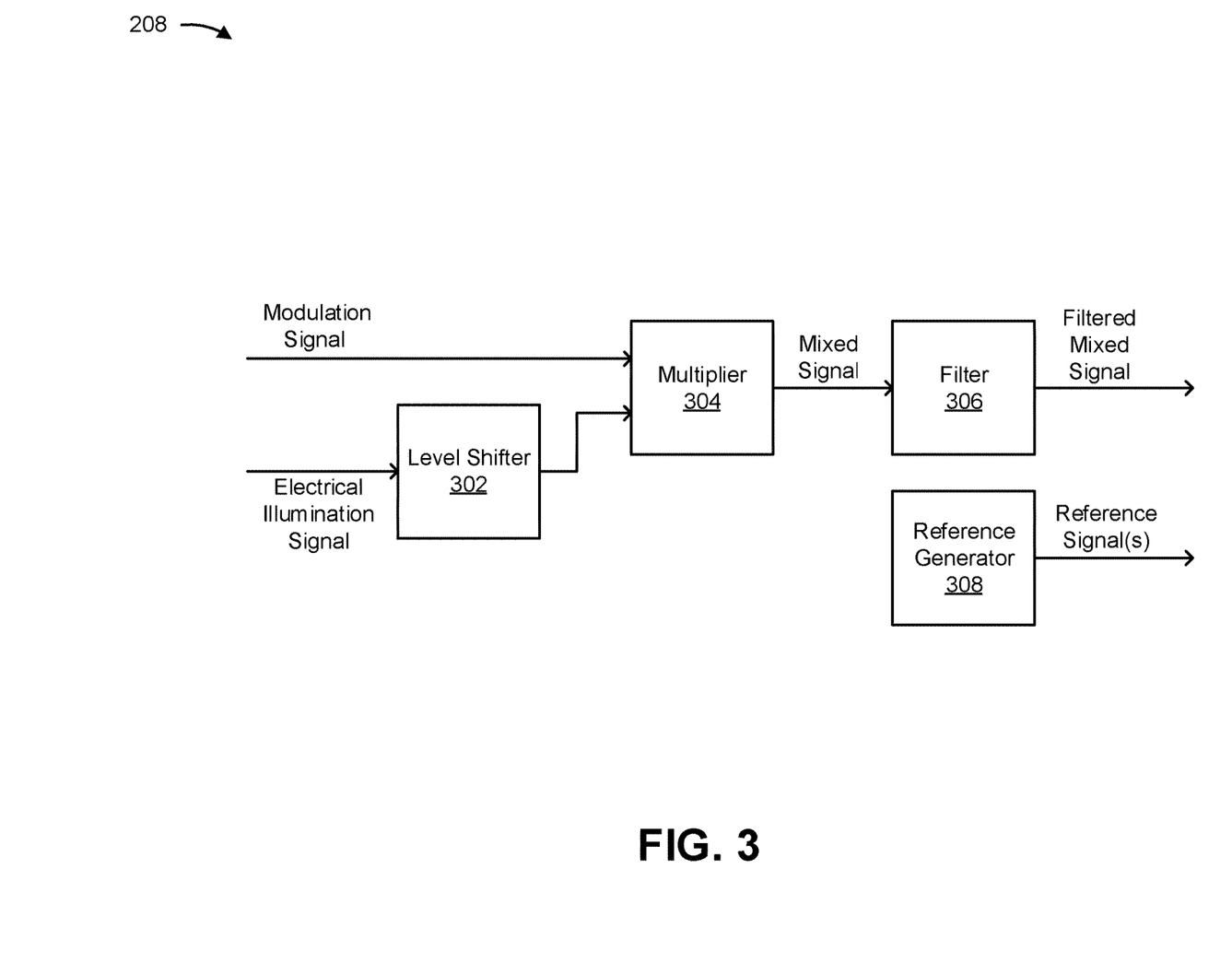
FIG. 3 is a diagram of example components of an electrical mixer included in the imaging system of FIG. 2.

FIG. 3 is a diagram of example components of electrical mixer 208 included in imaging system 200. As shown, electrical mixer 208 may include a level shifter 302, a multiplier 304, a filter 306, and a reference generator 308.

Level shifter 302 includes a component to adjust a level (e.g., an amplitude) of the electrical illumination signal before multiplication with the modulation signal. In some implementations, level shifter 302 may adjust the amplitude of the electrical illumination signal such that the amplitude is a particular range for further processing by electrical mixer 208 (e.g., a voltage range within which electrical mixer 208 is designed to operate). In some implementations, level shifter 302 may be designed such that level shifter 302 introduces little or no phase shift to the electrical illumination signal. As shown in FIG. 3, level shifter 302 may receive the electrical illumination signal and, after adjusting the amplitude of the electrical illumination signal, may provide the electrical illumination signal to multiplier 304.

Multiplier 304 includes a component to multiply the electrical illumination signal and the modulation signal. For example, multiplier 304 may include a logic gate, a Gilbert cell, and/or another type of electrical circuit that performs a multiplication of at least two electrical signals. As shown in FIG. 3, multiplier 304 may receive the modulation signal (e.g., from modulation component 204) and may receive the electrical illumination signal (e.g., from level shifter 302). In operation, multiplier 304 multiplies the modulation signal and the electrical illumination signal in order to form a mixed signal, as shown. In some implementations, the multiplication by multiplier 304, provides a mixed signal including a higher frequency portion and a lower frequency portion. In some implementations, multiplier 304 provides the mixed signal to filter 306.

Filter 306 includes a component to filter the mixed signal output by multiplier 304. For example, filter 306 may include a low-pass filter, a high-pass filter, and/or another type of electrical circuit that performs a filtering function. In some implementations, filter 306 may attenuate a portion of the mixed signal with a first frequency, and may pass a portion of the mixed signal with a second frequency. For example, when filter 306 is a low-pass filter, filter 306 may attenuate a portion of the signal with a frequency that is higher than a threshold frequency, and may pass a portion of the mixed signal with a frequency that is at or lower than the threshold frequency. In some implementations, filter 306 is needed since the multiplication by multiplier 304, provides a mixed signal including a higher frequency portion and a lower frequency portion. In some implementations, as shown, filter 306 outputs the filtered mixed signal.

In some implementations, electrical mixer 208 may output a calibration signal based on the filtered mixed signal. For example, the filtered mixed signal may be provided as the calibration signal. As another example, the filtered mixed signal may be compared to a reference signal (e.g., generated by reference generator 308), a result of which may be provided as the calibration signal.

In some implementations, a magnitude of the calibration signal is proportional to a delay of one or more components of imaging system 200. For example, in some implementations, the magnitude of the calibration signal is proportional to a delay of illumination component 202 associated with initiating an illumination sequence and emitting the modulated optical signal. For example, the delay of illumination component 202 to emit the modulated optical signal after illumination component 202 has received a trigger to do so may be represented by the magnitude of the calibration signal. In some implementations, other properties of the calibration signal (e.g., a relative phase, a voltage offset, a current offset, a shape of a waveform, and/or the like) may be used to represent the delay of illumination component 202, or the delay of another component of imaging system 200.

Reference generator 308 includes a component to generate a set of reference signals (e.g., a comparatively higher voltage reference signal and a comparatively lower voltage reference signal) to be compared to the filtered mixed signal, a result of which may be used as the calibration signal, in some implementations. For example, the value of the filtered mixed signal can be between a zero voltage and a supply voltage, and the exact value of the supply voltage may be unknown (e.g., due to variation of a voltage regulator, due to change with temperature, and/or the like). As such, reference generator 308 may serve as a reference circuit that allows the supply voltage to be measured. Here, the filtered mixed signal can be referenced to the supply voltage, and the calibration signal may reflect this referencing in order to ensure proper calibration by calibration component 210. In some implementations, reference generator 308 may generate two or more reference signals, and the filtered mixed reference signal may be referenced to at least one of the two or more reference signals.

Notably, the calibration signal (e.g., the filtered mixed signal, a result of comparing the filtered mixed signal and a reference signal) is independent of an integration time associated with the array of photosensitive pixels included in sensor component 206. For example, since neither of multiplier 304 and filter 306 perform a function that requires integration for a particular amount of time (e.g., an exposure time of the photosensitive pixels), the calibration signal does not in any way depend on the integration time. As such, the calibration signal may be available for use in outputting the calibration signal such that the in-line regulation of the delay may be achieved, as described above.

Figure 4:
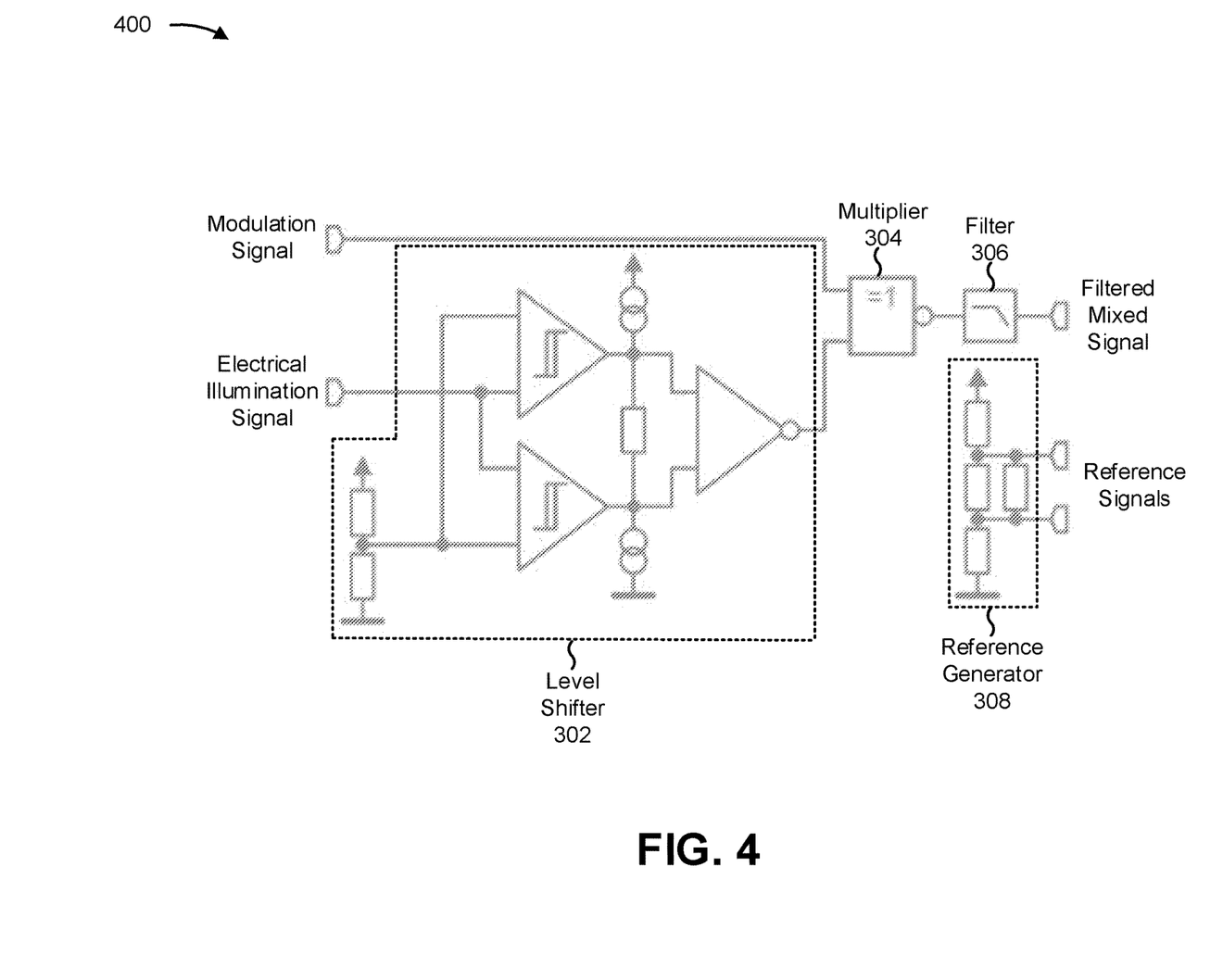
FIG. 4 is a diagram of an example implementation of the electrical mixer of FIG. 3.

FIG. 4 is a diagram of an example implementation 400 of an electrical mixer 208 that includes the above described components shown in FIG. 3. Of course, example implementation 400 is provided merely for illustrative purposes, and other example implementations are possible.

The number and arrangement of components shown in FIGS. 3 and 4 are provided as examples. In practice, there may be additional components, fewer components, different components, or differently arranged components than those shown in FIGS. 3 and 4. Furthermore, two or more components shown in FIGS. 3 and/or 4 may be implemented within a single component, or a single component shown in FIGS. 3 and/or 4 may be implemented as multiple, distributed devices and/or components. Additionally, or alternatively, a set of components (e.g., one or more components) shown in FIGS. 3 and/or 4 may perform one or more functions described as being performed by another set of components shown in FIGS. 3 and/or 4.

Figure 5:
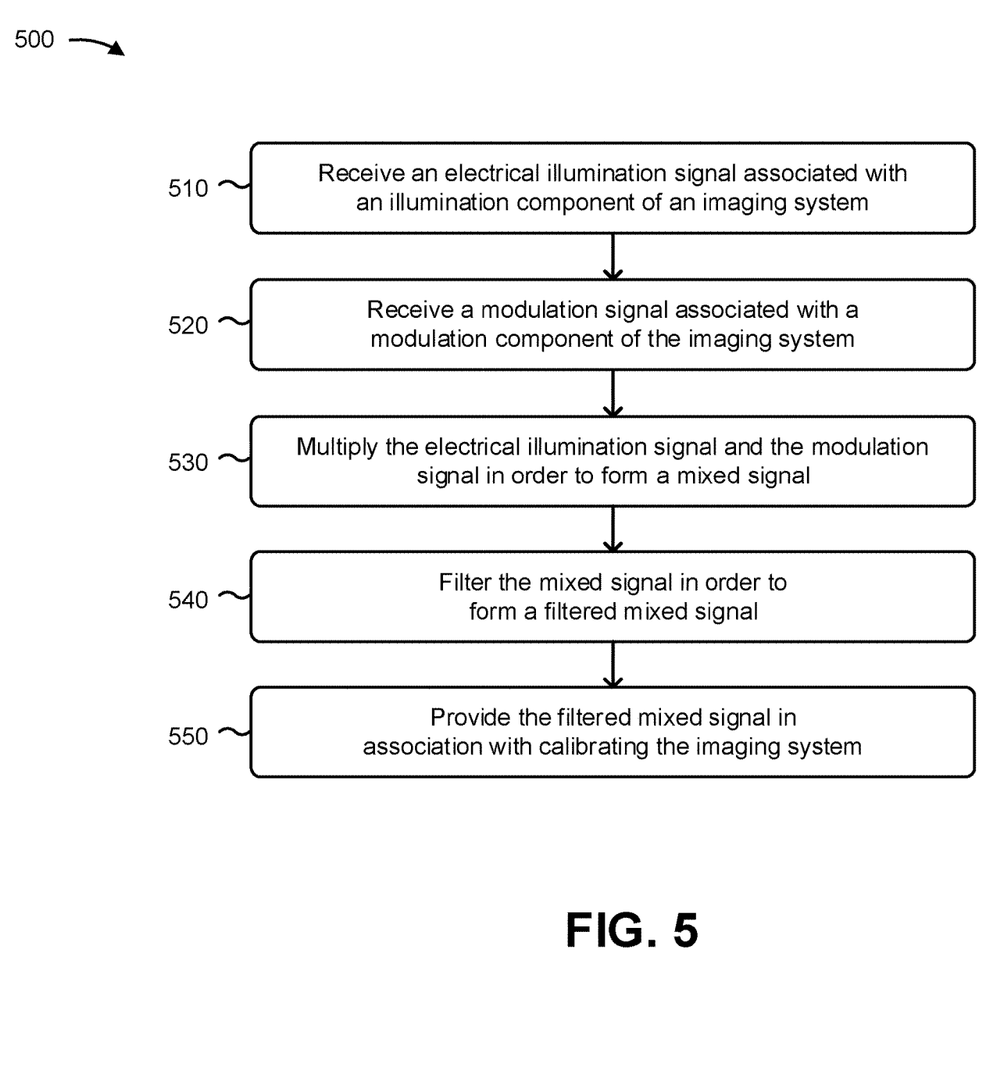
FIG. 5 is a flow chart of an example process for using an electrical mixer in association with calibrating a delay of an imaging system.

FIG. 5 is a flow chart of an example process 500 for using an electrical mixer in association with calibrating a delay of an imaging system. In some implementations, one or more process blocks of FIG. 5 may be performed by electrical mixer 208 of imaging system 200.

As shown in FIG. 5, process 500 may include receiving an electrical illumination signal associated with an illumination component of an imaging system (block 510). For example, electrical mixer 208 may receive an electrical illumination signal associated with illumination component 202 of imaging system 200, as described above.

As further shown in FIG. 5, process 500 may include receiving a modulation signal associated with a modulation component of the imaging system (block 520). For example, electrical mixer 208 may receive a modulation signal associated with modulation component 204 of imaging system 200, as described above.

As further shown in FIG. 5, process 500 may include multiplying the electrical illumination signal and the modulation signal in order to form a mixed signal (block 530). For example, electrical mixer 208 may multiply the electrical illumination signal and the modulation signal in order to form a mixed signal, as described above.

As further shown in FIG. 5, process 500 may include filtering the mixed signal in order to form a filtered mixed signal (block 540). For example, electrical mixer 208 may filter the mixed signal in order to form a filtered mixed signal, as described above.

As further shown in FIG. 5, process 500 may include providing the filtered mixed signal in association with calibrating the imaging system (block 550). For example, electrical mixer 208 may provide the filtered mixed signal in association with calibrating imaging system 200, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described here provide techniques and apparatuses for compensating for a drift in a delay of illumination component 202 of imaging system 200 based on using an on-chip electrical mixer 208 (e.g., an electrical mixing circuit that is not a pixel in a pixel array of imaging system 200).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An imaging system, comprising:
   a modulation component to provide a modulation signal;
   an illumination component to:
      receive the modulation signal and emit a modulated optical signal based on the modulation signal; and
      provide an electrical illumination signal,
         wherein the electrical illumination signal is an electrical representation of the modulated optical signal emitted by the illumination component; and
   a sensor pixel arranged to receive a reflected modulated optical signal after the modulated optical signal is reflected by an object,
      the sensor pixel being associated with an integration time corresponding to an exposure time of the sensor pixel;
   an electrical mixer to:
      receive the electrical illumination signal and the modulation signal;
      multiply the electrical illumination signal and the modulation signal in order to form a mixed signal;
      filter the mixed signal in order to form a filtered mixed signal; and
      output, based on the filtered mixed signal, a calibration signal associated with calibrating the imaging system,
         the calibration signal being independent of the integration time associated with the sensor pixel.

2. The imaging system of claim 1,
   wherein the electrical mixer is not working on a time-of-flight principle used in the sensor pixel.

3. The imaging system of claim 1, wherein the electrical mixer comprises an electrical circuit including an electrical non-linear element capable of multiplying the electrical illumination signal and the modulation signal.

4. The imaging system of claim 1, wherein the calibration signal is associated with compensating a delay between the modulation signal and the modulated optical signal.

5. The imaging system of claim 4, wherein the delay includes a temperature dependent delay of the illumination component in association with emitting the modulated optical signal.

6. The imaging system of claim 1, wherein the electrical mixer includes a logic gate to multiply the electrical illumination signal and the modulation signal.

7. The imaging system of claim 1, wherein the electrical mixer includes a low-pass filter associated with filtering the mixed signal.

8. The imaging system of claim 1, wherein the electrical mixer comprises a level shifter to adjust an amplitude of the electrical illumination signal before the electrical illumination signal and the modulation signal are multiplied.

9. The imaging system of claim 1, wherein the electrical mixer includes a reference generator to provide a set of reference signals to be compared to the filtered mixed signal in association with calibrating the imaging system.

10. The imaging system of claim 1, further comprising a calibration component to:
    receive the calibration signal; and
    calibrate the imaging system based on the calibration signal.

11. The imaging system of claim 1, wherein the illumination component includes:
    a light-emitting diode (LED), or
    a laser emitter.

* * * * *